(No Model.)
D. C. CAMP.
ICE CREAM FREEZER.
No. 449,665. Patented Apr. 7, 1891.
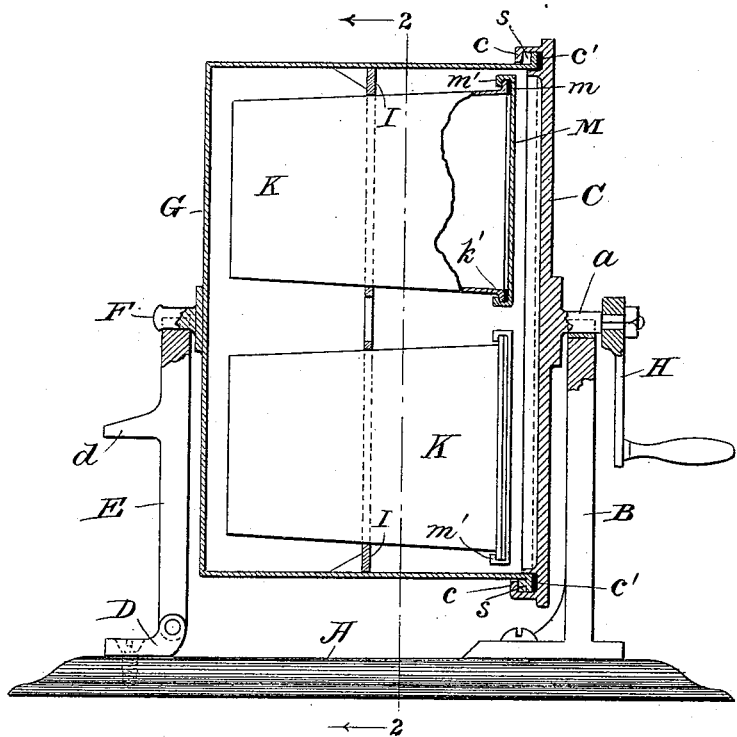
FIG. 1.
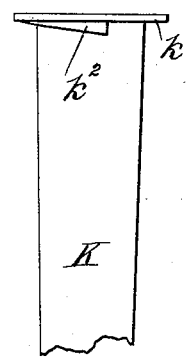
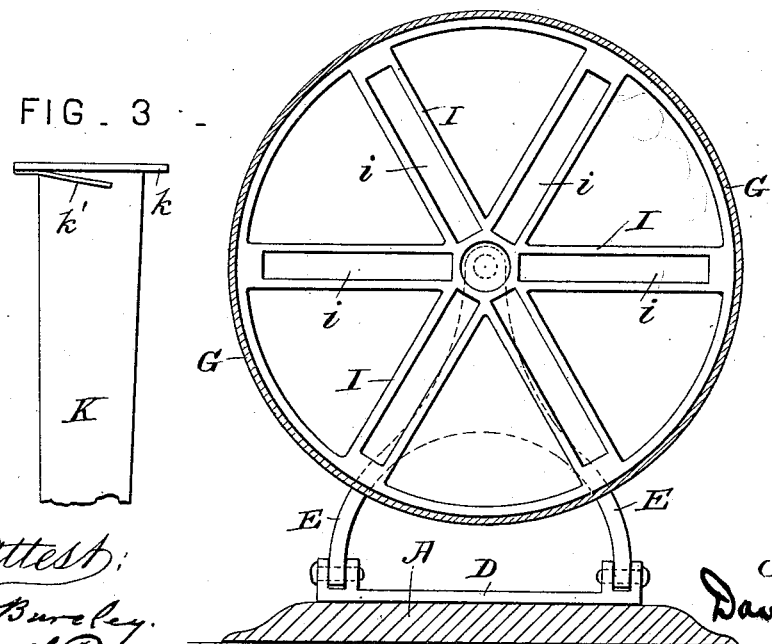
FIG. 3. FIG. 2. FIG. 4.
Attest:
L. Bureley.
Mo. J. Pennycook
Inventor:
David C. Camp.
By J. H. Evans.
atty.

UNITED STATES PATENT OFFICE.

DAVID C. CAMP, OF GAINESVILLE, GEORGIA.

ICE-CREAM FREEZER.

SPECIFICATION forming part of Letters Patent No. 449,665, dated April 7, 1891.

Application filed March 6, 1891. Serial No. 384,027. (No model.)

*To all whom it may concern:*

Be it known that I, DAVID C. CAMP, a citizen of the United States, residing at Gainesville, in the county of Hall and State of Georgia, have invented certain new and useful Improvements in Ice-Cream Freezers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to certain new and useful improvements in ice-cream freezers, and more particularly to that class wherein the prepared cream is placed in suitable molds or cups, which are then sealed in any convenient manner and inserted in a receptacle containing a freezing-liquid and the contents thereof agitated until the cream is solidified; and to these ends the novelty consists in placing the liquid to be frozen in suitable molds or cups, inclosing the same in a vessel containing a freezing-mixture, and agitating the same until the contents of the molds or cups are solidified, all of which will be hereinafter more fully explained, and particularly pointed out in the claim.

In the accompanying drawings, wherein the same letters of reference indicate like parts of my invention, Figure 1 is an end elevation of my machine, showing the drum or agitator and a portion of one of the cream-containing molds or cups in section. Fig. 2 is a section on the line 2 2 of Fig. 1. Fig. 3 shows the mouth of one of the molds and the spring at one end under the flange to secure the cap or cover in place; and Fig. 4 is a modification of the same in which a wedge-shaped lip or lug is cast on the under side of the flange to form a rigid lock in contradistinction to the spring shown in Fig. 3.

A is the base, and rigidly secured thereto is a bracket B, the upper end of which is provided with a semicircular bearing which supports the shaft $a$ of the cap C, and D is a knee likewise rigidly secured to the base, and to said knee is hinged an upright extension E, the upper end of which forms a bearing for the short spindle F, centrally secured to the drum G, and upon said spindle F and shaft $a$ the drum G may be rotated by means of the crank H. This drum, which I have shown as circular, but which may of course be of any suitable shape, is provided with a removable diaphragm or partition I, having a series of rectangular openings $i$, in which are placed the molds K, and which serve to retain the molds in position while the drum is being rotated. These molds are preferably wedge-shaped, or they may be of any shape that will allow the withdrawal of the cream intact after it has been frozen. The molds may be closed in any convenient manner, and in the present instance the mouth is provided with a flange $k$, upon which the cover M rests, and $m$ is a rubber band or packing which seals the joint between the cover and the flange of the mold. The cover is provided with lips $m'$, one of which is located at each end thereof, and which slides under the spring $k'$, (shown in Fig. 3,) the pressure of the spring serving to hold the cover in intimate contact with the flange or mouth of the mold. In Fig. 4 I show in lieu of the spring an integral wedge or inclined plane $k^2$, upon which the lips of the cover ride the same as the spring. The flange O on the periphery of the drum is likewise provided with integral wedge-shaped lugs $s$, which are engaged by the lips $c$ on the cap C, and as these lugs lie in the direction in which the drum is rotated it follows that the act of rotating the drum has a tendency to tighten the joint between the cap and the flange on the drum. A rubber band $c'$ is shown in Fig. 1 to insure the sealing of the joint.

For convenience of manipulation I have shown the extension E hinged to the knee D, so that after the refrigeration is completed and by using the crank as a lever and raising the drum while the spindle F is still in the bearing in the upright or extension E and tilting the whole over until the foot $d$ rests upon the table the cap C may be removed, the molds withdrawn, emptied, refilled, the cap replaced, and the drum restored to its normal position, ready for a second freezing.

The manner of operating the drum, the construction thereof, and likewise that of the molds may be varied without departing from the spirit of my invention, as

I claim solely—

In an ice-cream freezer, the horizontally-journaled drum G, provided with the removable air-tight cover C, in combination with the series of sealed molds K, located in the open diaphragm I in said drum G, so as to be wholly free from contact therewith, substantially as described, whereby the molds are exposed on all sides to the freezing-mixture as the drum is rotated.

In testimony whereof I affix my signature in presence of two witnesses.

DAVID C. CAMP.

Witnesses:
HENRY J. ENNIS,
JOHN T. PENNYCOOK.